US011859629B2

(12) United States Patent
Shinoda et al.

(10) Patent No.: US 11,859,629 B2
(45) Date of Patent: Jan. 2, 2024

(54) TURBO FLUID MACHINE

(71) Applicant: KABUSHIKI KAISHA TOYOTA JIDOSHOKKI, Aichi (JP)

(72) Inventors: Fumiya Shinoda, Aichi (JP); Fumihiro Suzuki, Aichi (JP); Ryo Umeyama, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 17/956,081

(22) Filed: Sep. 29, 2022

(65) Prior Publication Data

US 2023/0108681 A1 Apr. 6, 2023

(30) Foreign Application Priority Data

Oct. 6, 2021 (JP) ................................ 2021-164480

(51) Int. Cl.

| | |
|---|---|
| ***F04D 29/056*** | (2006.01) |
| ***F04D 25/06*** | (2006.01) |
| ***F04D 17/10*** | (2006.01) |
| ***F04D 29/58*** | (2006.01) |
| ***F04D 29/053*** | (2006.01) |

(52) U.S. Cl.

CPC ........... *F04D 29/056* (2013.01); *F04D 17/10* (2013.01); *F04D 25/0606* (2013.01); *F04D 29/053* (2013.01); *F04D 29/5806* (2013.01); *F05D 2240/50* (2013.01); *F05D 2240/60* (2013.01)

(58) Field of Classification Search

None

See application file for complete search history.

(56) References Cited

U.S. PATENT DOCUMENTS 5,110,220 A * 5/1992 Gu ........................ F16C 17/042 384/106
6,350,059 B1 2/2002 Takahashi
9,964,143 B2 5/2018 Yoshino et al.

(Continued)

FOREIGN PATENT DOCUMENTS

JP H06505547 A 6/1994
JP H1122722 A 1/1999

(Continued)

OTHER PUBLICATIONS

Park et al KR-20170061479-A + machine translation (Year: 2017).*

*Primary Examiner* — Juan G Flores

(74) *Attorney, Agent, or Firm* — Greenblum & Bernstein, P.L.C.

(57) ABSTRACT

A turbo fluid machine includes a rotary shaft configured to rotate in one rotational direction, and a thrust foil bearing that includes: a plurality of bump foils each having a corrugated shape and a plurality of top foils each having a bearing surface that faces a thrust collar. Each bump foil is divided into an outer peripheral foil and an inner peripheral foil in a radial direction of the rotary shaft. Ridges on the outer peripheral foil are inclined in the other rotational direction of the rotary shaft while extending from an edge of the outer peripheral foil adjacent to an inner peripheral side toward an outer peripheral side, and the ridges on the inner peripheral foil are inclined in the other rotational direction while extending from an edge of the inner peripheral foil adjacent to the outer peripheral side toward the inner peripheral side.

5 Claims, 6 Drawing Sheets

(56) References Cited

U.S. PATENT DOCUMENTS

| | | | | |
|---|---|---|---|---|
| 10,138,934 | B2 * | 11/2018 | Omori | F16C 27/02 |
| 10,415,634 | B2 | 9/2019 | Park et al. | |
| 2015/0362012 | A1 * | 12/2015 | Ermilov | F16C 43/02<br>384/105 |

FOREIGN PATENT DOCUMENTS

| | | | |
|---|---|---|---|
| JP | 2000346056 | A | 12/2000 |
| JP | 2015132309 | A | 7/2015 |
| JP | 2015132333 | A | 7/2015 |
| JP | 2017025824 | A | 2/2017 |
| JP | 2020115021 | A | 7/2020 |
| JP | 6742349 | B2 | 8/2020 |

* cited by examiner

TURBO FLUID MACHINE

CROSS-REFERENCE TO RELATED APPLICATION

This application claims priority to Japanese Patent Application No. 2021-164480 filed on Oct. 6, 2021, the entire disclosure of which is incorporated herein by reference.

The present disclosure relates to a turbo fluid machine.

BACKGROUND ART

Japanese Patent Application Publication No. 2020-115021 discloses a known turbo fluid machine. This turbo fluid machine includes a rotary shaft, an operating part configured to rotate together with the rotary shaft to compress and discharge a fluid, a housing for accommodating the rotary shaft and the operating part, and a thrust foil bearing supporting the rotary shaft in an axial direction of the rotary shaft such that the rotary shaft is rotatable relative to the housing.

The rotary shaft includes a thrust collar having a plate-like shape and integrally formed on the rotary shaft such that the thrust collar radially extends from a peripheral surface of the rotary shaft. The thrust collar is rotatable together with the rotary shaft. The thrust foil bearing includes a bearing housing, a plurality of bump foils, and a plurality of top foils.

The bearing housing has an insertion hole through which the rotary shaft is inserted, and faces the thrust collar in the axial direction of the rotary shaft. The bump foils are attached on an end face of the bearing housing adjacent to the thrust collar, and equally spaced from each other around the insertion hole. Each of the bump foils is formed of an elastic corrugated thin plate. Each of the top foils is formed of an elastic thin plate that has a bearing surface facing the thrust collar, and elastically supported by the bump foil at the back surface of the top foil. One end face of the thrust collar adjacent to the top foil serves as a bearing-contact surface that faces the bearing surface of the top foil in the axial direction of the rotary shaft.

The top foil of the thrust foil bearing supports the thrust collar, which rotates relative to the housing at low speed rotation of the rotary shaft, with the top foil in contact with the thrust collar. At high speed rotation of the rotary shaft, the rotary shaft is supported by a fluid film produced in a bearing gap between the bearing-contact surface and the bearing surface without the top foil in contact with thrust collar.

However, the thrust foil bearing of such a turbo fluid machine may cause the fluid compressed in the bearing gap to leak from the inner and outer peripheral sides of the bearing gap due to a pressure difference between the bearing gap and its surroundings, thereby causing a decrease in a pressure of the fluid film that decreases a load capacity of the bearing.

In order to solve such a problem, for example, a herringbone groove may be formed in the bearing surface of the top foil or the bearing-contact surface of the thrust collar such that the peak of the V-shape of the groove is oriented frontward in the rotational direction of the rotary shaft. This solution allows the fluid in the bearing gap to be guided by the herringbone groove toward the peak of the V-shape, in other words, toward the radially center portion of the top foil from the inner and outer peripheral sides of the top foil, thereby suppressing a leak of the fluid in the bearing gap from the bearing.

However, providing the herringbone groove of this solution causes a decrease in area of contact between the bearing surface and the bearing-contact surface at low speed rotation of the rotary shaft, thereby causing an increase in the contact surface pressure. This therefore may cause wear or burn-in on the top foil, which decreases the durability of the top foil.

The present invention, which has been made in light of the above-mentioned problem, is directed to providing a turbo fluid machine that is capable of suppressing a decrease in a pressure of a fluid film on a thrust foil bearing so as to suppress a decrease in a load capacity of the thrust foil bearing without causing a decrease in the durability of a top foil.

SUMMARY

In accordance with an aspect of the present disclosure, there is provided a turbo fluid machine that includes: a rotary shaft, a thrust collar, an operating part, a housing, and a thrust foil bearing. The rotary shaft is configured to rotate in one rotational direction about an axis of the rotary shaft. The thrust collar has a plate-like shape and is formed on the rotary shaft such that the thrust collar extends from a peripheral surface of the rotary shaft in a radial direction of the rotary shaft. The thrust collar is rotatable together with the rotary shaft. The operating part is configured to rotate together with the rotary shaft to compress and discharge a fluid. The housing accommodates the rotary shaft and the operating part. The thrust foil bearing supports the rotary shaft in an axial direction of the rotary shaft such that the rotary shaft is rotatable relative to the housing. The thrust foil bearing includes: a bearing housing, a plurality of bump foils, and a plurality of top foils. The bearing housing has an insertion hole through which the rotary shaft is inserted, and faces the thrust collar in the axial direction. The bump foils are attached on an end face of the beating housing adjacent to the thrust collar and disposed alongside around the insertion hole. The top foils are each formed of an elastic thin plate and have opposite surfaces. One of the opposite surfaces serves as a bearing surface that faces the thrust collar. The other of the opposite surfaces is elastically supported by the corresponding bump foil. Each of the bump foils is formed of an elastic thin plate that has a corrugated shape in which ridges of projections projected toward the thrust collar are arranged in a circumferential direction of the rotary shaft. Each of the bump foils is divided into an outer peripheral foil and an inner peripheral foil arranged respectively on an outer peripheral side and an inner peripheral side of the bump foil in the radial direction of the rotary shaft. The ridges on the outer peripheral foil are inclined in the other rotational direction of the rotary shaft while extending from an edge of the outer peripheral foil adjacent to the inner peripheral side toward the outer peripheral side. The ridges on the inner peripheral foil are inclined in the other rotational direction of the rotary shaft while extending from an edge of the inner peripheral foil adjacent to the outer peripheral side toward the inner peripheral side.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which.

DESCRIPTION OF THE EMBODIMENTS

The following will describe an embodiment of the present disclosure in detail with reference to the accompanying drawings.

Embodiment

According to an embodiment, a turbo compressor 10 serves as a turbo fluid machine of this disclosure. The turbo compressor 10 is mounted on a fuel cell vehicle that includes a fuel cell system 1. The fuel cell system 1 supplies oxygen and hydrogen to a fuel cell mounted on the vehicle to generate electricity. The turbo compressor 10 compresses air containing oxygen to be supplied to the fuel cell.

Figure 1:
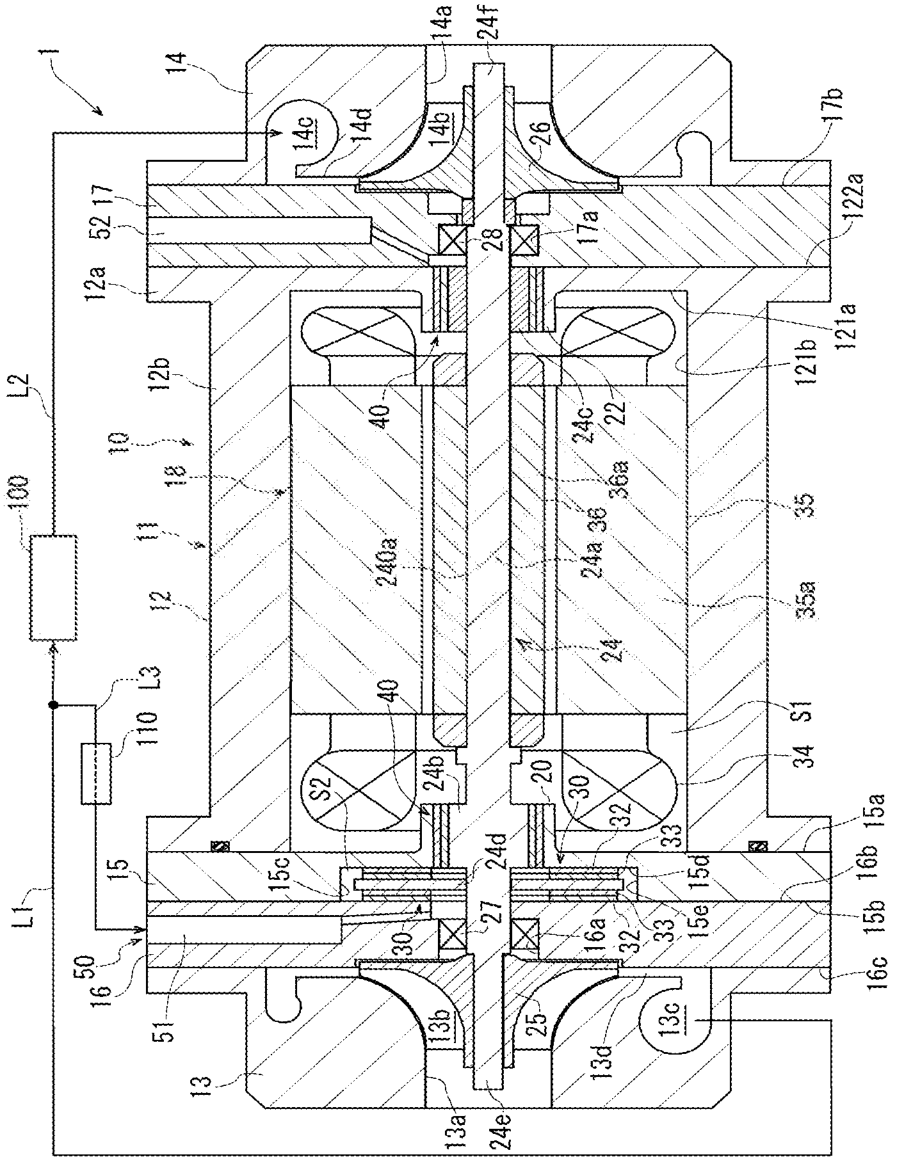
FIG. 1 is a sectional view of a turbo compressor according to an embodiment.

As illustrated in FIG. 1, the turbo compressor 10, which serves as the turbo fluid machine of the present disclosure, includes a housing 11. The housing 11 is made of metal, such as aluminum alloy. The housing 11 includes a motor housing 12, a compressor housing 13, a turbine housing 14, a first plate 15, a second plate 16, and a third plate 17.

The motor housing 12 includes a plate-like end wall 12*a* and a peripheral wall 12*b*. The peripheral wall 12*b* has a cylindrical shape and protrudes from an outer peripheral portion of the end wall 12*a*. The first plate 15 is connected to an open end of the peripheral wall 12*b* of the motor housing 12 to close an opening of the peripheral wall 12*b*.

In the motor housing 12, an inner surface 121*a* of the end wall 12*a*, an inner peripheral surface 121*b* of the peripheral wall 12*b*, and an end face 15*a* of the first plate 15 adjacent to the motor housing 12 cooperate to form a motor chamber S1. The motor chamber S1 accommodates an electric motor 18.

The first plate 15 has a first bearing holding portion 20. The first bearing holding portion 20 projects from the center portion of the end face 15*a* of the first plate 15 toward the electric motor 18. The first bearing holding portion 20 has a cylindrical shape.

The other end face 15*b* of the first plate 15 is distant from the motor housing 12, and has a recess 15*c* having a bottom surface 15*d*. The recess 15*c* has a circular hole shape. The cylindrical first bearing holding portion 20 is opened toward the bottom surface 15*d* of the recess 15*c* through the first plate 15. The recess 15*c* is formed coaxially with the first bearing holding portion 20. The recess 15*c* has an inner peripheral surface 15*e* through which the end face 15*b* is connected to the bottom surface 15*d*.

The motor housing 12 has a second bearing holding portion 22. The second bearing holding portion 22 projects from the center portion of the inner surface 121*a* of the end wall 12*a* of the motor housing 12 toward the electric motor 18. The second bearing holding portion 22 has a cylindrical shape. The cylindrical second beating holding portion 22 is opened on an outer surface 122*a* of the end wall 12*a* through the end wall 12*a* of the motor housing 12. The first bearing holding portion 20 is formed coaxially with the second bearing holding portion 22.

Figure 2:
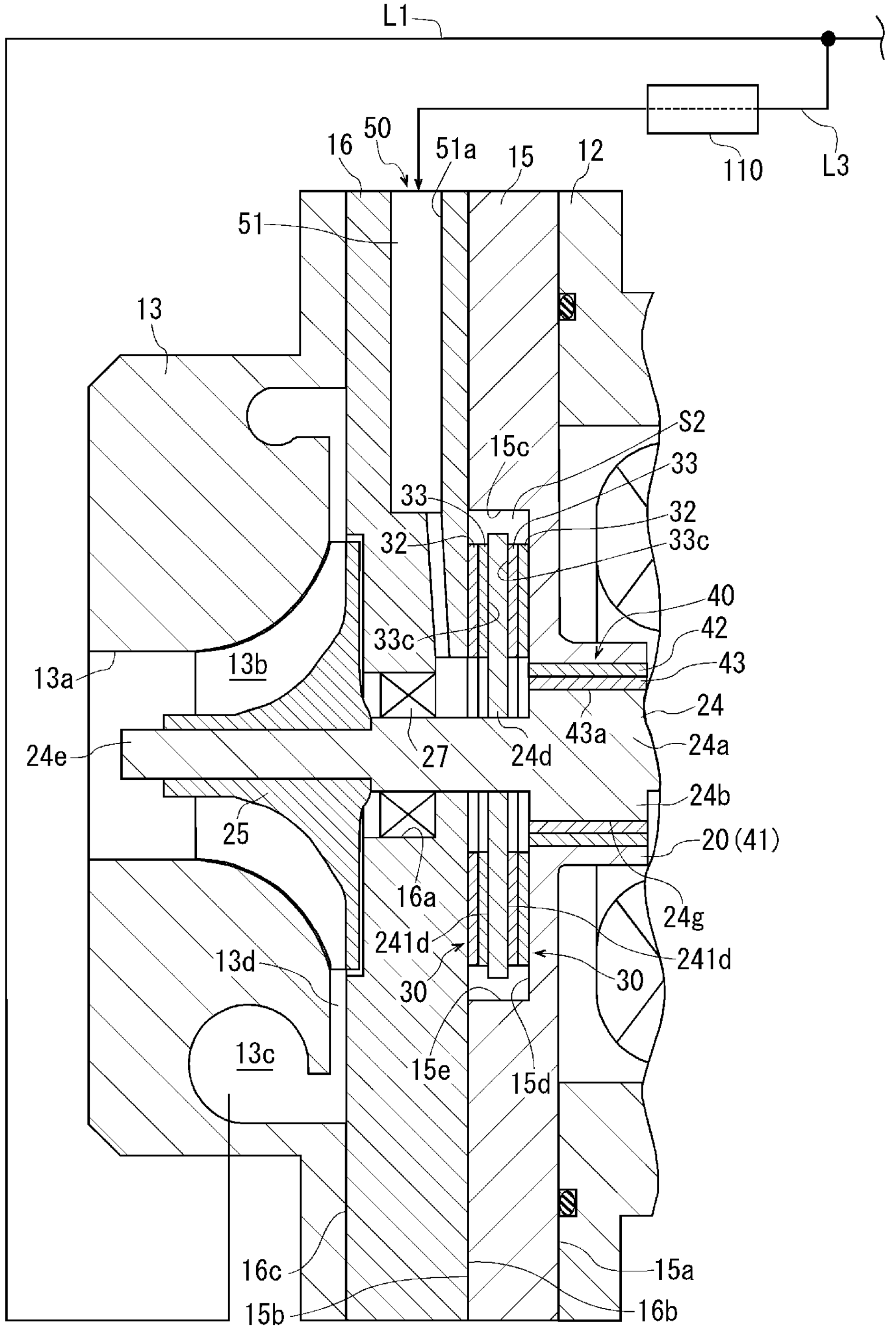
FIG. 2 is a fragmentary enlarged sectional view of the turbo compressor according to the embodiment.

As illustrated in FIG. 2, the second plate 16 is connected to the end face 15*b* of the first plate 15. The second plate 16 has a shaft insertion hole 16*a* at the center portion of the second plate 16. The shaft insertion hole 16*a* is communicated with the recess 15*c*. The shaft insertion hole 16*a* is formed coaxially with the recess 15*c* and the first bearing holding portion 20. The second plate 16 has an end face 16*b* that is located adjacent to the first plate 15, and the end face 16*b* cooperates with the recess 15*c* of the first plate 15 to define a thrust bearing accommodation chamber S2.

The compressor housing 13 has a cylindrical shape, and has a circular hole-shaped inlet 13*a* through which air is drawn into the compressor housing 13. The compressor housing 13 is connected to the other end face 16*c* of the second plate 16 that is distant from the first plate 15. The inlet 13*a* of the compressor housing 13 is formed coaxially with the shaft insertion hole 16*a* of the second plate 16 and the first bearing holding portion 20. The inlet 13*a* is opened on an end face of the compressor housing 13 that is distant from the second plate 16.

A first bladed wheel chamber 13*b*, a discharge chamber 13*c*, and a first diffuser passage 13*d* are formed between the compressor housing 13 and the end face 16*c* of the second plate 16. The first bladed wheel chamber 13*b* is communicated with the inlet 13*a*. The discharge chamber 13*c* extends about the axis of the inlet 13*a* around the first bladed wheel chamber 13*b*. The first bladed wheel chamber 13*b* is communicated with the discharge chamber 13*c* through the first diffuser passage 13*d*. The first bladed wheel chamber 13*b* is communicated with the shaft insertion hole 16*a* of the second plate 16.

Figure 3:
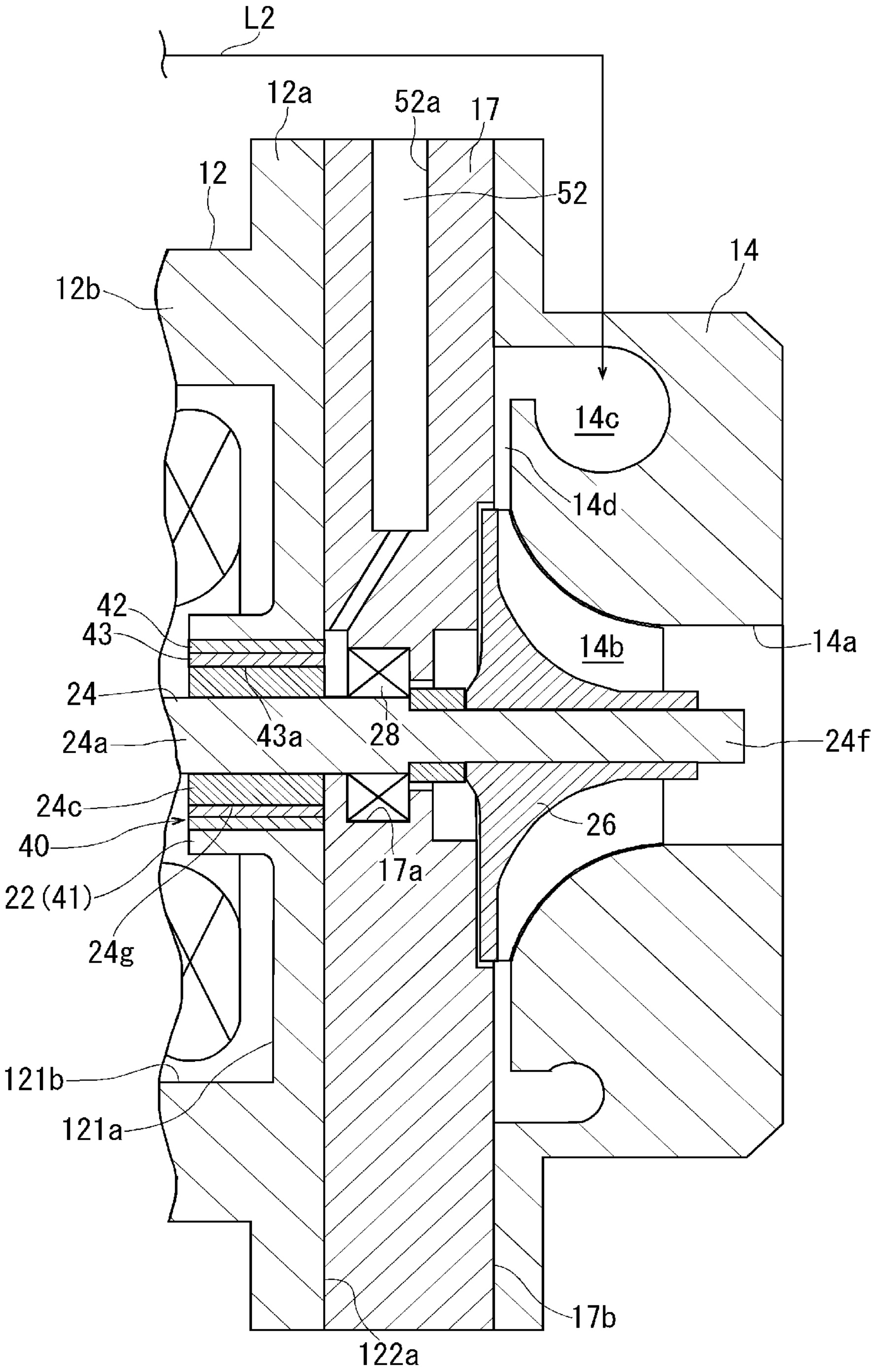
FIG. 3 is another fragmentary enlarged sectional view of the turbo compressor according to the embodiment.

As illustrated in FIG. 3, the third plate 17 is connected to the outer surface 122*a* of the end wall 12*a* of the motor housing 12. The third plate 17 has a shaft insertion hole 17*a* at the center portion of the third plate 17. The shaft insertion hole 17*a* is communicated with the second beating holding portion 22. The shaft insertion hole 17*a* is formed coaxially with the second bearing holding portion 22.

The turbine housing 14 has a cylindrical shape, and has a circular hole-shaped outlet 14*a* through which air is discharged. The turbine housing 14 is connected to the other end face 17*b* of the third plate 17 that is distant from the motor housing 12. The outlet 14*a* of the turbine housing 14 is formed coaxially with the shaft insertion hole 17*a* of the third plate 17 and the second bearing holding portion 22. The outlet 14*a* is opened on an end face of the turbine housing 14 that is distant from the third plate 17.

A second bladed wheel chamber 14*b*, a suction chamber 14*c*, and a second diffuser passage 14*d* are formed between the turbine housing 14 and the end face 17*b* of the third plate 17. The second bladed wheel chamber 14*b* is communicated with the outlet 14*a*. The suction chamber 14*c* extends about the axis of the outlet 14*a* around the second bladed wheel chamber 14*b*. The second bladed wheel chamber 14*b* is communicated with the suction chamber 14*c* through the second diffuser passage 14*d*. The second bladed wheel chamber 14*b* is communicated with the shaft insertion hole 17*a* of the third plate 17.

As illustrated in FIG. 1, a rotating member 24 is accommodated in the housing 11. The rotating member 24 has a rotary shaft 24*a* as a shaft portion, a first supporting portion 24*b*, a second supporting portion 24*c*, and a third supporting portion 24*d*. The rotary shaft 24*a* has a first end portion 24*e* as an end adjacent to the compressor housing 13 and a second end portion 24*f* as an end adjacent to the turbine housing 14. The first supporting portion 24*b* is formed in a part of an outer peripheral surface 240*a* of the rotary shaft 24*a* adjacent to the first end portion 24*e*, and disposed in the first bearing holding portion 20. The first supporting portion 24*b* is formed integrally with the rotary shaft 24*a* and projected from the outer peripheral surface 240*a* of the rotary shaft 24*a* so as to have a ring shape.

The second supporting portion 24*c* is formed in a part of the outer peripheral surface 240*a* of the rotary shaft 24*a* adjacent to the second end portion 24*f*, and disposed in the second bearing holding portion 22. The second supporting portion 24*c* has a cylindrical shape such that the second supporting portion 24*c* is projected from the outer peripheral surface 240*a* of the rotary shaft 24*a* so as to have a ring shape, and is fixed to the outer peripheral surface 240*a* of the rotary shaft 24*a*. The second supporting portion 24*c* is rotatable together with the rotary shaft 24*a*.

The third supporting portion 24*d* is disposed in the thrust bearing accommodation chamber S2. The third supporting portion 24*d* has a disc shape (i.e., plate-like shape) such that the third supporting portion 24*d* extends from the outer peripheral surface 240*a* of the rotary shaft 24*a* in the radial direction so as to have a ring shape, and is fixed to the outer peripheral surface 240*a* of the rotary shaft 24*a*. The third supporting portion 24*d* is rotatable together with the rotary shaft 24*a*. The third supporting portion 24*d* is disposed distant from the electric motor 18 in the axial direction of the rotary shaft 24*a*. The third supporting portion 24*d* serves as the thrust collar of the present disclosure.

In the following description, directions, such as the axial direction, the circumferential direction, and the radial direction denote the directions of the rotary shaft 24*a*. One and the other circumferential directions respectively denote opposite one and the other rotational directions of the rotary shaft 24*a* about its axis. One side and the other side in the axial direction respectively mean a side on which the first end portion 24*e* of the rotary shaft 24*a* is located and a side on which the second end portion 24*f* of the rotary shaft 24*a* is located.

The first end portion 24*e* of the rotary shaft 24*a* is connected to a first bladed wheel 25 that serves as the operating part of the present disclosure. The first bladed wheel 25 is disposed closer to the first end portion 24*e* than to the third supporting portion 24*d* of the rotary shaft 24*a*. The first bladed wheel 25 is accommodated in the first bladed wheel chamber 13*b*. The second end portion 24*f* of the rotary shaft 24*a* is connected to a second bladed wheel 26. The second bladed wheel 26 is disposed closer to the second end portion 24*f* than to the second supporting portion 24*c* of the rotary shaft 24*a*. The second bladed wheel 26 is accommodated in the second bladed wheel chamber 14*b*. The first bladed wheel 25, the second bladed wheel 26, and the rotating member 24 are accommodated in the housing 11.

A first sealing member 27 is disposed between the shaft insertion hole 16*a* of the second plate 16 and the rotating member 24. The first sealing member 27 suppresses leak of air from the first bladed wheel chamber 13*b* toward the motor chamber S1. A second sealing member 28 is disposed between the shaft insertion hole 17*a* of the third plate 17 and the rotating member 24. The second sealing member 28 suppresses leak of air from the second bladed wheel chamber 14*b* toward the motor chamber S1. The first sealing member 27 and the second sealing member 28 are each a seal ring, for example.

The electric motor 18 includes a cylindrical rotor 36 and a cylindrical stator 35. The rotor 36 is fixed to the rotary shaft 24*a*. The stator 35 is fixed in the housing 11. The rotor 36 is disposed radially inside the stator 35 and rotated together with the rotating member 24. The rotor 36 includes a cylindrical rotor core 36*a* fixed to the rotary shaft 24*a* and a plurality of permanent magnets, which is not illustrated, disposed in the rotor core 36*a*. The stator 35 surrounds the rotor 36. The stator 35 includes a stator core 35*a* and a coil 34. The stator core 35*a* has a cylindrical shape and is fixed to the inner peripheral surface 121*b* of the peripheral wall 12*b* of the motor housing 12. The coil 34 is wound around the stator core 35*a*. The coil 34 receives current from a battery (not illustrated) so that the rotor 36 is rotated together with the rotating member 24.

The fuel cell system 1 includes a fuel cell stack 100 as a fuel cell mounted on a vehicle, the turbo compressor 10, a supply passage L1, a discharge passage L2, and a branched passage L3. The fuel cell stack 100 includes a plurality of fuel cells. The fuel cell stack 100 is connected to the discharge chamber 13*c* through the supply passage L1. The fuel cell stack 100 is also connected to the suction chamber 14*c* through the discharge passage L2. The branched passage L3 in which an intercooler 110 is disposed branches off from the supply passage L1. The intercooler 110 cools air flowing through the branched passage L3.

When the rotating member 24 is rotated together with the rotor 36, the first bladed wheel 25 and the second bladed wheel 26 are rotated together with the rotating member 24. Air, which has been drawn through the inlet 13*a*, is compressed by the first bladed wheel 25 in the first bladed wheel chamber 13*b*, and discharged from the discharge chamber 13*c* through the first diffuser passage 13*d*. The air discharged from the discharge chamber 13*c* is supplied to the fuel cell stack 100 through the supply passage L1. The air supplied to the fuel cell stack 100 is used for electricity generation by the fuel cell stack 100, and the used air is then discharged as exhaust from the fuel cell stack 100 to the discharge passage L2. The exhaust from the fuel cell stack 100 is drawn into the suction chamber 14*c* through the discharge passage L2. The exhaust drawn into the suction chamber 14*c* is then discharged to the second bladed wheel chamber 14*b* through the second diffuser passage 14*d*. The exhaust discharged into the second bladed wheel chamber 14*b* rotates the second bladed wheel 26. The rotating member 24 is rotated by the electric motor 18 and also by the rotation of the second bladed wheel 26 by the exhaust from the fuel cell stack 100. The first bladed wheel 25 serving as the operating part of the present disclosure is rotated together with the rotating member 24 to compress and discharge air, which serves as the fluid of the present disclosure. The exhaust discharged into the second bladed wheel chamber 14*b* is discharged outside from the outlet 14*a*.

The turbo compressor 10 includes a pair of thrust foil bearings 30, 30 and a pair of radial foil bearings 40, 40. The pair of thrust foil bearings 30, 30 supports the rotary shaft 24*a* in the axial direction of the rotary shaft 24*a* such that the rotary shaft 24*a* is rotatable relative to the housing 11. The pair of radial foil bearings 40, 40 supports the rotary shaft 24*a* in a direction perpendicular to the axial direction of the rotary shaft 24*a* such that the rotary shaft 24*a* is rotatable relative to the housing 11.

The pair of thrust foil bearings 30, 30 is disposed in the thrust bearing accommodation chamber S2. The thrust foil bearings 30, 30 hold therebetween the third supporting portion 24*d* as the thrust collar. The thrust foil bearings 30, 30 face the third supporting portion 24*d* in the axial direction of the rotary shaft 24*a*. One of the thrust foil bearings 30, 30 is located adjacent to the first end portion 24*e* of the rotary shaft 24*a* with respect to the third supporting portion 24*d*. The other of the thrust foil bearings 30, 30 is located adjacent to the second end portion 24*f* of the rotary shaft 24*a* with respect to the third supporting portion 24*d*.

The opposite end faces of the third supporting portion 24*d* serve as bearing-contact surfaces 241*d*, 241*d*. One of the bearing-contact surfaces 241*d*, 241*d* adjacent to the first end portion 24*e* of the rotary shaft 24*a* is axially supported by the one of the thrust foil bearings 30, 30 (see FIGS. 2 and 7). The other of the bearing-contact surfaces 241*d*, 241*d* adjacent to the second end portion 24*f* of the rotary shaft 24*a* is axially supported by the other of the thrust foil bearings 30, 30.

Since one and the other of the thrust foil bearings 30, 30 have the same configuration, the following description will focus on the one of the thrust foil bearings 30, 30, and will not elaborate the other of the thrust foil bearings 30, 30.

In the following description, the rotary shaft 24*a* is rotated in the one rotational direction about the axis of the rotary shaft 24*a* when the rotating member 24 is rotated together with the rotor 36. In this embodiment, the one rotational direction about the axis of the rotary shaft 24*a* means the counterclockwise rotational direction of the rotary shaft 24*a* illustrated in FIG. 4, and is indicated by the arrow R in FIGS. 4-8.

Figure 4:
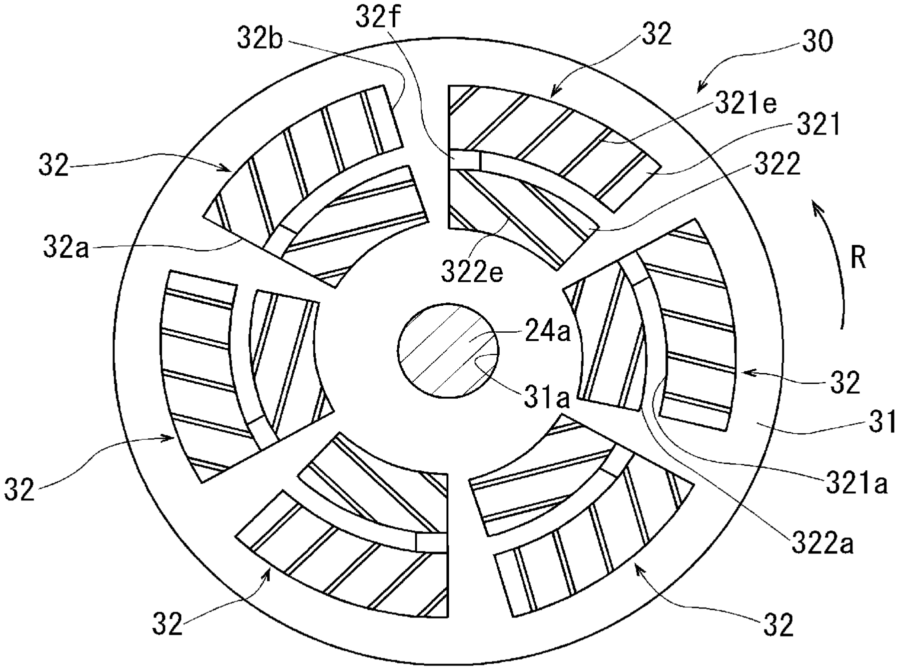
FIG. 4 is a plane view of the turbo compressor according to the embodiment, illustrating a shape and a configuration of a bump foil.
Figure 5:
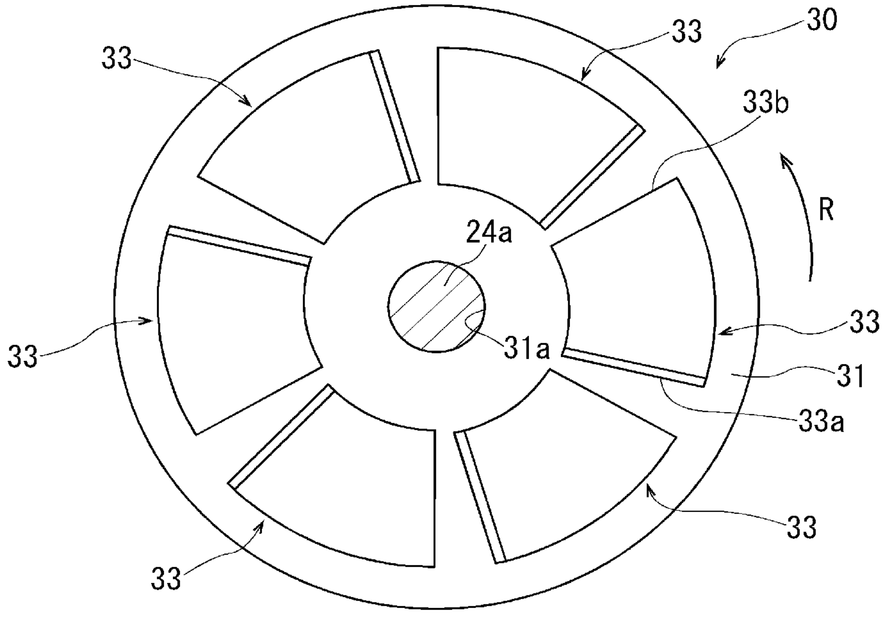
FIG. 5 is a plane view of the turbo compressor according to the embodiment, illustrating a shape and a configuration of a top foil.

As illustrated in FIGS. 4 and 5, the thrust foil bearing 30 includes a bearing housing 31, six bump foils 32 attached to the bearing housing 31, and six top foils 33 attached to the bearing housing 31 and located at positions respectively corresponding to the bump foils 32. Each of the bump foils 32 and each of the top foils 33 have an approximately fan-like outline in a plane view. The bump foils 32 and the top foils 33 are each formed of an elastic thin plate, which is made of metal, such as stainless steel, and have a predetermined shape.

The bearing housing 31 is formed of a part of the second plate 16. That is, the bearing housing 31 is formed of the end face 16*b* of the second plate 16 at a part of the end face 16*b* that defines the thrust bearing accommodation chamber S2. The bearing housing 31 faces the third supporting portion 24*d* in the axial direction of the rotary shaft 24*a*. The bearing housing 31 has an insertion hole 31*a* through which the rotary shaft 24*a* is inserted. Additionally, the other of the thrust foil bearings 30, 30 includes a bearing housing 31 that is formed of the recess 15*c* of the first plate 15 that defines the thrust bearing accommodation chamber S2.

In this embodiment, the six bump foils 32 are attached on an end face of the bearing housing 31 adjacent to the third supporting portion 24*d*, and equally spaced from each other around the insertion hole 31*a* in the circumferential direction of the rotary shaft 24*a*.

Each of the bump foils 32 has opposite ends in the circumferential direction, and one end of the opposite ends is fixed to the bearing housing 31 by welding. That is, the one end of the bump foil 32 is a fixed end 32*a*, and the other end of the bump foil 32, which is located behind the one end of the bump foil 32 in the one circumferential direction, is a free end 32*b*. Reversely, the one end and the other end of the bump foil 32 may be respectively a free end and a fixed end.

Figure 7:
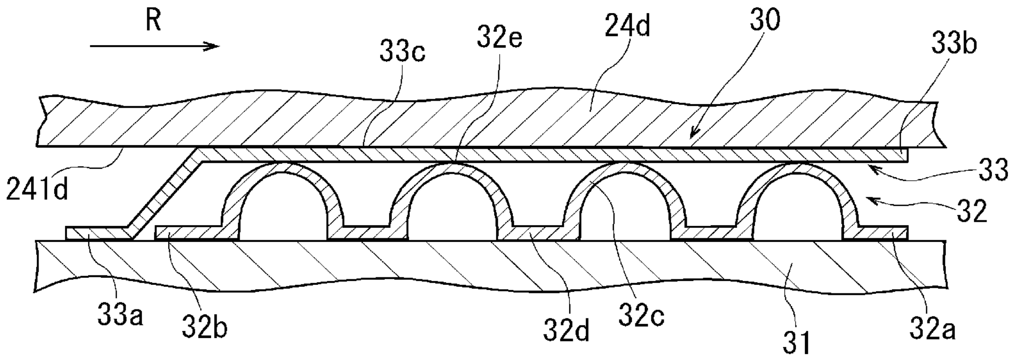
FIG. 7 is a sectional view of the turbo compressor according to the embodiment, explaining an operation of a thrust foil bearing.

As illustrated in FIG. 7, the bump foil 32 has a corrugated shape in which a plurality of projections 32*c* and a plurality of depressions 32*d* are alternatingly arranged in the circumferential direction of the rotary shaft 24*a*. That is, a plurality of ridges 32*e* of the projections 32*c* are arranged in the circumferential direction of the rotary shaft 24*a*, and includes a plurality of outer ridges 321*e* and a plurality of inner ridges 322*e*. The projections 32*c* are projected toward the third supporting portion 24*d* to come in contact with the top foil 33 so as to elastically support the top foil 33. One of the opposite surfaces of the top foil 33 serves as a bearing surface 33*c* that faces the bearing-contact surface 241*d* of the third supporting portion 24*d* in the axial direction, and the other of the opposite surfaces of the top foil 33 is elastically supported by the corresponding bump foil 32.

Each of the bump foils 32 is divided with respect to the radial direction of the rotary shaft 24*a* into an outer peripheral foil 321 and an inner peripheral foil 322 that are respectively arranged on the outer peripheral side and the inner peripheral side of the bump foil 32. The outer peripheral foil 321 has one end and the other end that is located behind the one end of the outer peripheral foil 321 in the one circumferential direction. The inner peripheral foil 322 has one end and the other end that is located behind the one end of the inner peripheral foil 322 in the one circumferential direction. The one end of the outer peripheral foil 321 is integrally connected to the one end of the inner peripheral foil 322 by a connecting portion 32*f*. This connection with the connecting portion 32*f* facilitates the handling and the assembly of the outer peripheral foil 321 and the inner peripheral foil 322. This connection with the connecting portion 32*f* does not interfere with the operation and the transformation of the outer peripheral foil 321 and the inner peripheral foil 322.

As illustrated in FIG. 4, the outer peripheral foil 321 has the plurality of outer ridges 321*e*, and an edge 321*a*, which is one of the opposite edges of the outer peripheral foil 321 in the radial direction and located adjacent to the inner peripheral side with respect to the other of the opposite edges. The outer ridges 321*e* are inclined in the other rotational direction while extending from the edge 321*a* toward the outer peripheral side. The inner peripheral foil 322 has the plurality of inner ridges 322*e*, and an edge 322*a*, which is one of the opposite edges of the inner peripheral foil 322 in the radial direction and located adjacent to the outer peripheral side with respect to the other of the opposite edges. The inner ridges 322*e* are inclined in the other rotational direction while extending from the edge 322*a* toward the inner peripheral side.

Figure 6:
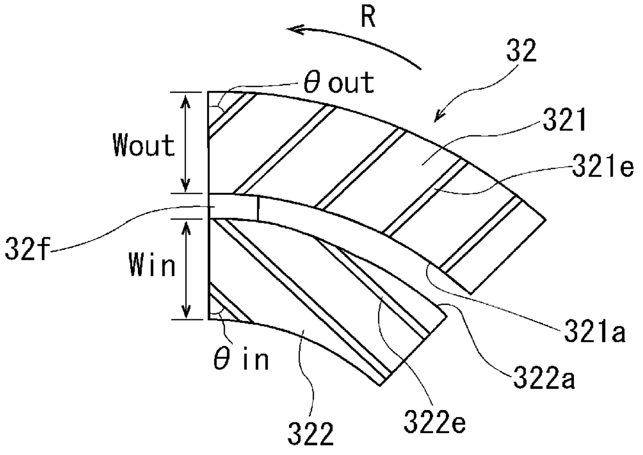
FIG. 6 is a plane view of the turbo compressor according to the embodiment, illustrating the shape of the bump foil.

As illustrated in FIG. 6, the outer peripheral foil 321 and the inner peripheral foil 322 respectively have an outer radial width Wout and an inner radial width Win in the radial direction, and the outer radial width Wout is equal to the inner radial width Win. Each outer ridge 321*e* of the outer peripheral foil 321 and each inner ridge 322*e* of the inner peripheral foil 322 respectively form an outer acute angle θout and an inner acute angle θin with the radial direction, and the outer acute angle θout is equal to the inner acute angle θin. The outer acute angle θout of the outer ridge 321*e* of the outer peripheral foil 321 may mean an inclined angle of the outer ridge 321*e* at which the outer ridge 321*e* is inclined in the other rotational direction. The inner acute angle θin of the inner ridge 322*e* of the inner peripheral foil 322 may mean an inclined angle of the inner ridge 322*e* at which the inner ridge 322*e* is inclined in the other rotational direction.

In this embodiment, the six top foils 33 are attached on the end face of the bearing housing 31 adjacent to the third supporting portion 24*d*, and the top foils 33 are disposed alongside around the insertion hole 31*a* and equally spaced from each other in the circumferential direction of the rotary shaft 24*a* so as to respectively correspond to the bump foils 32. Each of the top foils 33 has opposite ends in the circumferential direction, and one end of the opposite ends is located in front of the other end of the opposite ends in the one circumferential direction of the rotary shaft 24*a*. The other end of the opposite ends is folded toward the bearing housing 31 and fixed to the bearing housing 31 at the distal portion of the other end by welding. That is, the one end and the other end of the top foil 33 are a free end 33*b* and a fixed end 33*a*, respectively.

One of the radial foil bearings 40, 40 is disposed in the first bearing holding portion 20, and the other of the radial foil bearings 40, 40 is disposed in the second bearing holding portion 22. In the first bearing holding portion 20, the first supporting portion 24*b* of the rotating member 24 is rotatably supported by the one of the radial foil bearings 40, 40. The first supporting portion 24*b* has an outer peripheral surface that serves as a radial bearing-contact surface 24*g* supported by the one of the radial foil bearings 40, 40 in the direction perpendicular to the axial direction of the rotary shaft 24*a*. In the second bearing holding portion 22, the second supporting portion 24*c* of the rotating member 24 is rotatably supported by the other of the radial foil bearings 40, 40. The second supporting portion 24*c* has an outer peripheral surface that serves as the radial bearing-contact surface 24*g* supported by the other of the radial foil bearings 40, 40 in the direction perpendicular to the axial direction of the rotary shaft 24*a*.

Since one and the other of the radial foil bearings 40, 40 have the same configuration, the following description will focus on the one of the radial foil bearings 40, 40, and will not elaborate the other of the radial foil bearings 40, 40.

The radial foil bearing 40 includes a radial bearing housing 41, a radial bump foil 42, and a radial top foil 43. The first bearing holding portion 20 serves as the radial bearing housing 41 of the one of the radial foil bearings 40, 40 and the second bearing holding portion 22 serves as the radial bearing housing 41 of the other of the radial foil bearings 40, 40.

The radial bump foil 42 and the radial top foil 43 are each formed of an elastic thin plate made of metal, such as stainless steel, and has a predetermined approximately cylindrical shape. The radial bump foil 42 and the radial top foil 43 each have opposite ends in the circumferential direction of the rotary shaft 24*a*, and one end of the opposite ends is located in front of the other end of the opposite ends in the one circumferential direction of the rotary shaft 24*a*. The other end of the opposite ends is folded outwardly in the radial direction and fixed to the radial bearing housing 41.

That is, the one end and the other end of each of the radial bump foil 42 and the radial top foil 43 are a free end and a fixed end, respectively.

The radial bump foil 42 has a corrugated shape in which a plurality of projections projected toward the radial top foil 43 has ridges arranged in the circumferential direction of the rotary shaft 24*a*. The radial bump foil 42 also has depressions alternating with the projections, and elastically supports the radial top foil 43 by the projections with the depressions supported by the radial bearing housing 41. The radial top foil 43 is elastically supported by the radial bump foil 42 at one of the opposite surfaces of the radial top foil 43, and the other surface of the radial top foil 43 serves as a radial bearing surface 43*a* (see FIGS. 2 and 3) that faces the radial bearing-contact surface 24*g* in the radial direction.

As illustrated in FIG. 7, the thrust foil bearings 30, 30 support the rotary shaft 24*a* with the bearing surface 33*c* of the top foil 33 in contact with the bearing-contact surface 241*d* of the third supporting portion 24*d* until the rotational speed of the rotary shaft 24*a* reaches a floating rotational speed at which the third supporting portion 24*d* serving as the thrust collar floats off the thrust foil bearings 30, 30.

Figure 8:
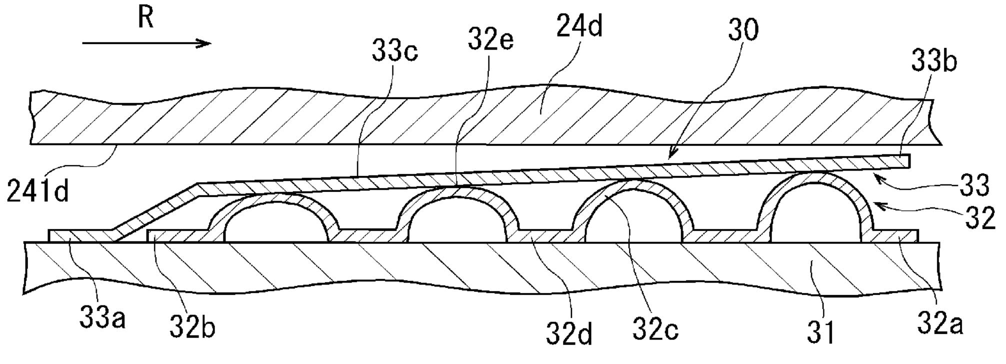
FIG. 8 is a sectional view of the turbo compressor according to the embodiment, explaining the operation of the thrust foil bearing.

As illustrated in FIG. 8, when the rotational speed of the rotary shaft 24*a* reaches the floating rotational speed, a pressure of the fluid film generated between the top foil 33 and the third supporting portion 24*d* causes the top foil 33 to elastically deform with elastic deformation of the bump foil 32, thereby causing the third supporting portion 24*d* to float off the thrust foil bearings 30, 30. Accordingly, the thrust foil bearings 30, 30 support the rotary shaft 24*a* without contacting the third supporting portion 24*d*.

The radial foil bearings 40, 40 support the rotary shaft 24*a* with the radial bearing surface 43*a* of the radial top foil 43 in contact with the radial bearing-contact surface 24*g* of the first supporting portion 24*b* and the radial bearing-contact surface 24*g* of the second supporting portion 24*c* until the rotational speed of the rotary shaft 24*a* reaches a floating rotational speed at which the first supporting portion 24*b* and the second supporting portion 24*c* of the rotary shaft 24*a* float off the radial foil bearings 40, 40. When the rotational speed of the rotary shaft 24*a* reaches the floating rotational speed, a pressure of the fluid film generated between the radial top foil 43 and the first and second supporting portions 24*b*, 24*c* causes the first and second supporting portions 24*b*, 24*c* to float off the radial foil bearings 40, 40. Accordingly, the radial foil bearings 40, 40 support the rotary shaft 24*a* without contacting the first supporting portion 24*b* and the second supporting portion 24*c*.

As illustrated in FIGS. 1-3, the housing 11 has a cooling passage 50. Air serving as the fluid flows through the cooling passage 50. The cooling passage 50 is formed through the second plate 16, the first plate 15, the motor housing 12, and the third plate 17. The cooling passage 50 includes a first passage 51 and a second passage 52.

The first passage 51 is formed in the second plate 16. The first passage 51 has an inlet 51*a* formed in a side wall surface of the second plate 16. The inlet 51*a* of the first passage 51 is connected to the supply passage L1 through the branched passage L3. The first passage 51 is communicated with the motor chamber S1 through the thrust bearing accommodation chamber S2 and the one of the radial foil bearings 40, 40.

The second passage 52 is formed in the third plate 17. The second passage 52 has an outlet 52*a* formed in a side surface of the third plate 17. The second passage 52 is communicated with the motor chamber S1 through the other of the radial foil bearings 40, 40.

The air flowed through the supply passage L1 toward the fuel cell stack 100 partly flows into the first passage 51 through the branched passage L3. The air in the first passage 51 has been cooled by the intercooler 110 while flowing through the branched passage L3. The cooled air in the first passage 51 flows into the thrust bearing accommodation chamber S2.

The cooled air in the thrust bearing accommodation chamber S2 flows from the inner peripheral side toward the outer peripheral side mainly through the one of the thrust foil bearings 30, 30. Specifically, the cooled air flows from the inner peripheral side of the top foil 33 toward the outer peripheral side of the top foil 33 through a gap between the top foil 33 and the bearing housing 31 of the one of the thrust foil bearings 30, 30. The cooled air flows radially outside of the third supporting portion 24*d* as the thrust collar, and flows from the outer peripheral side toward the inner peripheral side mainly through the other of the thrust foil bearings 30, 30. Specifically, the cooled air flows from the outer peripheral side of the top foil 33 toward the inner peripheral side of the top foil 33 through a gap between the top foil 33 and the bearing housing 31 of the other of the thrust foil bearings 30, 30.

The cooled air flows through the thrust bearing accommodation chamber S2 and then flows into the motor chamber S1 through the one of the radial foil bearings 40, 40. Specifically, the cooled air flows from the one side toward the other side in the axial direction, through a gap between the radial top foil 43 and the radial bearing housing 41 of the one of the radial foil bearings 40, 40. The cooled air flows through the one of the radial foil bearings 40, 40 and flows into the motor chamber S1.

The air in the motor chamber S1, for example, flows through a gap between the rotor 36 and the stator 35, and the air then flows into the second passage 52 through the other of the radial foil bearings 40, 40 and is discharged from the outlet 52*a*.

Accordingly, the cooled air flows through the cooling passage 50 so as to directly cool the electric motor 18, the pair of thrust foil bearings 30, 30, and the pair of radial foil bearings 40, 40.

In this turbo compressor 10, the bump foil 32 of each thrust foil bearing 30 is divided into the outer peripheral foil 321 on the outer peripheral side and the inner peripheral foil 322 on the inner peripheral side with respect to the radial direction of the rotary shaft 24*a*, and an inclined angle of the ridge 32*e* of each projection 32*c* of the corrugated shape is different between the outer peripheral foil 321 and the inner peripheral foil 322. Specifically, the outer ridges 321*e* on the outer peripheral foil 321 are inclined in the other rotational direction while extending from the edge 321*a* adjacent to the inner peripheral side toward the outer peripheral side. The inner ridges 322*e* on the inner peripheral foil 322 are inclined in the other rotational direction while extending from the edge 322*a* adjacent to the outer peripheral side toward the inner peripheral side. That is, the outer ridges 321*e* on the outer peripheral foil 321 are inclined rearward in a rotational direction R while extending from the inner peripheral side toward the outer peripheral side. In contrast, the inner ridges 322*e* on the inner peripheral foil 322 are inclined rearward in the rotational direction R while extending from the outer peripheral side toward the inner peripheral side.

In this configuration, the rotation of the rotary shaft 24*a* at a high rotational speed equal to or faster than the floating rotational speed causes the corrugated shape of the bump foil 32 to be transferred to the top foil 33, so that the top foil 33 has a herringbone shape such that the peak of each V-shape formed by ridges of projections on the top foil 33 is oriented frontward in the one rotational direction, i.e., in the rotational direction R. In the bearing gap between the bearing surface 33*c* of the top foil 33 and the bearing-contact surface 241*d* of the third supporting portion 24*d* as the thrust collar, this herringbone configuration allows the fluid to be guided by each ridge toward the peak of the V-shape, in other words, toward the radially center portion of the top foil 33 from the outer peripheral side and the inner peripheral side of the top foil 33. This configuration therefore suppresses a leak of the fluid compressed in the bearing gap from the outer peripheral side and the inner peripheral side, thereby suppressing a decrease in the pressure of the fluid film in the bearing gap.

In contrast, the thrust foil bearing 30 is likely to be heated by sliding of the thrust collar on the top foil 33 at low speed rotation of the thrust collar because the thrust collar is supported by the top foil 33 with the thrust collar in contact with the top foil 33. Since both of the bearing surface 33*c* and the bearing-contact surface 241*d* are not provided with a groove, area of contact between the bearing surface 33*c* and the bearing-contact surface 241*d* is not reduced by the presence of a groove at a low rotation speed of the rotary shaft 24*a* at which the rotary shaft 24*a* rotates at a rotational speed lower than the floating rotational speed such that the bearing-contact surface 241*d* slides on the bearing surface 33*c*. This prevents a decrease in the durability of the top foil 33 by wear or burn-in.

Accordingly, the turbo compressor 10 is capable of suppressing a decrease in the pressure of the fluid film on the thrust foil bearing 30 so as to suppress a decrease in a load capacity of the thrust foil bearing 30 without causing a decrease in the durability of the top foil 33.

The thrust foil bearing 30 may have a problem on a heat resistance of the top foil 33. At high speed rotation of the thrust collar, the top foil 33 is likely to be heated by shearing of a fluid film between the thrust collar and the top foil 33. The top foil 33 is formed of an elastic thin plate having a low heat capacity. Accordingly, the top foil 33 is likely to have high temperature. In this regard, the cooled air flows through the gap between the bearing housing 31 and the top foil 33 in the turbo compressor 10 so as to cool the top foil 33. This alleviates the problem on the heat resistance of the top foil 33.

Similarly, the cooled air flows through the gap between the radial bearing housing 41 and the radial top foil 43 of each radial foil bearing 40 so as to cool the radial top foil 43. This alleviates the problem on the heat resistance of the radial top foil 43.

If the first passage 51 of the cooling passage 50 is formed such that the cooled air flows through the gap between the bearing housing 31 and the top foil 33 of the thrust foil bearing 30, the fluid from the inner and outer peripheral sides of the bearing gap flows outside the thrust bearing accommodation chamber S2 through the first passage 51 together with the cooled air. The fluid leak from the inner and outer peripheral sides of the bearing gap directly leads to a decrease in the pressure of the fluid film. Accordingly, it is more important to suppress the fluid leak from the inner and outer peripheral sides of the bearing gap. In this regard, the turbo compressor 10 suppresses the fluid leak from the inner and outer peripheral sides of the bearing gap by the presence of the ridges of the projections on the top foil 33, so that this configuration exhibits this advantageous effects of fluid leak suppression notably if the first passage 51 of the cooling passage 50 is formed in the above-described manner.

The following will describe modification examples 1 to 3 in which the bump foil 32 of the thrust foil bearing 30 of the turbo compressor 10 is modified.

Modification Example 1 of Bump Foil

Figure 9:
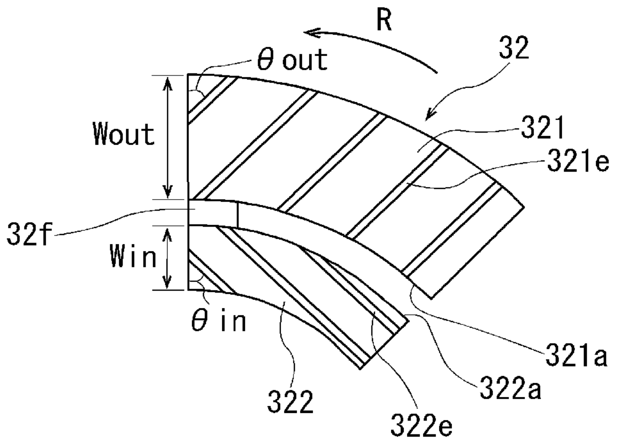
FIG. 9 is a plane view of the turbo compressor according to the embodiment, illustrating a bump foil according to a modification example 1.

As illustrated in FIG. 9, according to the modification example 1, the outer peripheral foil 321 and the inner peripheral foil 322 of the bump foil 32 respectively have the outer radial width Wout and the inner radial width Win in the radial direction, and the outer radial width Wout is greater than the inner radial width Win. The outer acute angle θout of the outer ridge 321*e* of the outer peripheral foil 321 is equal to the inner acute angle θin of the inner ridge 322*e* of the inner peripheral foil 322.

In each thrust foil bearing 30, centrifugal force causes the fluid leak from the bearing gap of the top foil 33 on the outer peripheral side to be larger than that on the inner peripheral side. In the thrust foil bearing 30 of the modification example 1, the outer radial width Wout of the outer peripheral foil 321 on the outer peripheral side is greater than the inner radial width Win of the inner peripheral foil 322 on the inner peripheral side. This configuration increases the force that effectively gathers the fluid, which may leak from the outer peripheral side of the top foil 33 by the centrifugal force, into the center portion of the top foil 33 in the radial direction, thereby suppressing the fluid leak from the outer peripheral side of the bearing gap effectively.

Modification Example 2 of Bump Foil

Figure 10:
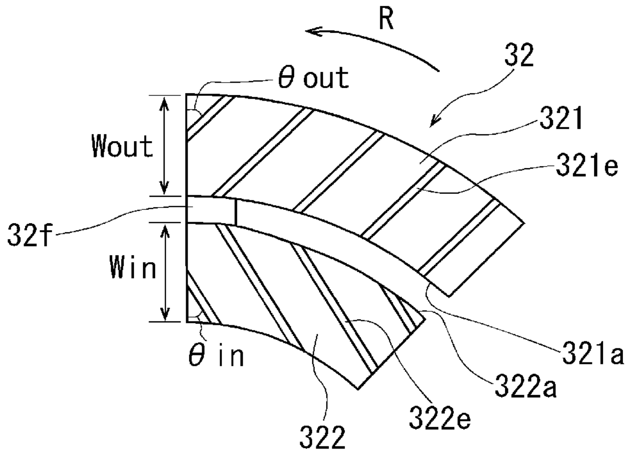
FIG. 10 is a plane view of the turbo compressor according to the embodiment, illustrating a bump foil according to a modification example 2.

As illustrated in FIG. 10, in the bump foil 32 according to the modification example 2, the outer acute angle θout of the outer ridge 321*e* of the outer peripheral foil 321 is greater than the inner acute angle θin of the inner ridge 322*e* of the inner peripheral foil 322. In the bump foil 32 according to the modification example 2, the outer radial width Wout of the outer peripheral foil 321 is equal to the inner radial width Win of the inner peripheral foil 322.

In this case, the centrifugal force increases the force that effectively gathers the fluid, which may leak from the outer peripheral side, into the radially center portion of the bearing gap in the top foil 33, thereby suppressing the fluid leak from the outer peripheral side of the beating gap effectively.

Modification Example 3 of Bump Foil

Figure 11:
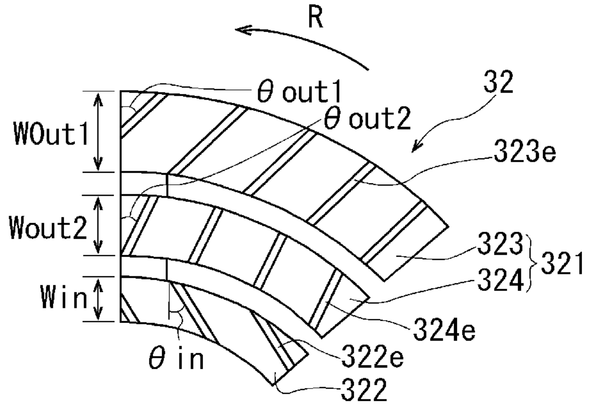
FIG. 11 is a plane view of the turbo compressor according to the embodiment, illustrating a bump foil according to a modification example 3.

As illustrated in FIG. 11, the outer peripheral foil 321 of the bump foil 32 according to the modification example 3 is divided into some portions arranged in the radial direction of the rotary shaft 24*a*. That is, the outer peripheral foil 321 is divided into a first outer peripheral foil 323 adjacent to the outer peripheral side and a second outer peripheral foil 324 adjacent to the inner peripheral side. The outer ridges 321*e* of the outer peripheral foil 321 include first ridges 323*e* on the first outer peripheral foil 323 and second ridges 324*e* on the second outer peripheral foil 324. Each first ridge 323*e* of the first outer peripheral foil 323 and each second ridge 324*e* of the second outer peripheral foil 324 respectively form a first outer acute angle θout1 and a second outer acute angle θout2 with the radial direction, and the first outer acute angle θout1 is greater than the second outer acute angle θout2. The first outer acute angle θout1 of the first ridge 323*e* of the first outer peripheral foil 323 is greater than the inner acute angle θin of the inner ridge 322*e* of the inner peripheral foil 322, and the inner acute angle θin of the inner ridge 322*e* is greater than the second outer acute angle θout2 of the second ridge 324*e* of the second outer peripheral foil 324. Further, the first outer peripheral foil 323 and the second outer peripheral foil 324 respectively have a first outer radial width Wout1 and a second outer radial width Wout2 in the radial direction. The first outer radial width Wout1 is greater than the second outer radial width Wout2, and the second outer radial width Wout2 is greater than the inner radial width Win of the inner peripheral foil 322.

In this case, the centrifugal force increases the force that gathers the fluid, which may leak from the outer peripheral side, into the center of the bearing gap in the top foil 33, thereby suppressing the fluid leak from the outer peripheral side of the bearing gap more effectively.

Although the present disclosure has been described based on the above embodiment, the present disclosure is not limited to the above embodiment, and may be modified within the scope of the present disclosure.

Although the thrust foil bearing 30 according to the embodiment includes the six bump foils 32 and the six top foils 33, the number of the bump foils 32 and the top foils 33 is not limited thereto as long as the number of the bump foils 32 is not singular and matches the number of the top foils 33.

In the thrust foil bearing 30 according to the embodiment, the outer peripheral foil 321 is connected to the inner peripheral foil 322 by the connecting portion 32*f*. However, the outer peripheral foil 321 may not be connected to the inner peripheral foil 322.

According to the embodiment, the housing 11 includes the second plate 16 and the first plate 15. A part of the second plate 16 serves as the bearing housing 31 of the one of the thrust foil bearings 30, 30. A part of the first plate 15 serves as the bearing housing 31 of the other of the thrust foil bearings 30, 30. However, the configuration of the bearing housing 31 of each thrust foil bearing 30 is not limited thereto. The bearing housing 31 of each thrust foil bearing 30 may be formed of a member that is not a member of the housing 11.

The present disclosure is applicable to an air compressor or the like for fuel cell system.

What is claimed is:

1. A turbo fluid machine comprising:

- a rotary shaft configured to rotate in one rotational direction about an axis of the rotary shaft;
- a thrust collar having a plate-like shape and formed on the rotary shaft such that the thrust collar extends from a peripheral surface of the rotary shaft in a radial direction of the rotary shaft, the thrust collar being rotatable together with the rotary shaft;
- an operating part configured to rotate together with the rotary shaft to compress and discharge a fluid;
- a housing accommodating the rotary shaft and the operating part; and
- a thrust foil bearing supporting the rotary shaft in an axial direction of the rotary shaft such that the rotary shaft is rotatable relative to the housing, wherein
- the thrust foil bearing includes:
  - a bearing housing having an insertion hole through which the rotary shaft is inserted and facing the thrust collar in the axial direction;
  - a plurality of bump foils attached on an end face of the bearing housing adjacent to the thrust collar, and the bump foils being disposed alongside around the insertion hole; and a plurality of top foils each formed of an elastic thin plate and having opposite surfaces, one of the opposite surfaces serving as a bearing surface that faces the thrust collar, the other of the opposite surfaces being elastically supported by a corresponding bump foil of the plurality of bump foils, each of the bump foils is formed of an elastic thin plate having a corrugated shape in which ridges of projections projected toward the thrust collar are arranged in a circumferential direction of the rotary shaft, each of the bump foils is divided into an outer peripheral foil and an inner peripheral foil arranged respectively on an outer peripheral side and an inner peripheral side of the bump foil in the radial direction of the rotary shaft, the ridges on the outer peripheral foil are inclined in the other rotational direction of the rotary shaft while extending from an edge of the outer peripheral foil adjacent to the inner peripheral side toward the outer peripheral side, and the ridges on the inner peripheral foil are inclined in the other rotational direction of the rotary shaft while extending from an edge of the inner peripheral foil adjacent to the outer peripheral side toward the inner peripheral side.

2. The turbo fluid machine according to claim 1, wherein the housing has a cooling passage through which a cooled fluid for cooling the thrust foil bearing flows, and the cooling passage is formed such that the cooled fluid flows through a gap between the bearing housing and each of the top foils from the inner peripheral side toward the outer peripheral side of the top foil or such that the cooled fluid flows through the gap between the bearing housing and each of the top foils from the outer peripheral side toward the inner peripheral side of the top foil.

3. The turbo fluid machine according to claim 1, wherein the outer peripheral foil and the inner peripheral foil of each bump foil of the plurality of bump foils respectively have an outer radial width and an inner radial width in the radial direction, and the outer radial width is greater than the inner radial width.

4. The turbo fluid machine according to claim 1, wherein each of the ridges of the outer peripheral foil and each of the ridges of the inner peripheral foil respectively form an outer acute angle and an inner acute angle with the radial direction, and the outer acute angle is greater than the inner acute angle.

5. The turbo fluid machine according to claim 1, wherein the outer peripheral foil is divided into a first outer peripheral foil adjacent to the outer peripheral side and a second outer peripheral foil adjacent to the inner peripheral side in the radial direction, and each of the ridges on the first outer peripheral foil and each of the ridges on the second outer peripheral foil respectively form a first outer acute angle and a second outer acute angle with the radial direction, and the first outer acute angle is greater than the second outer acute angle.

* * * * *